United States Patent

Cross et al.

[11] Patent Number: 5,810,571
[45] Date of Patent: Sep. 22, 1998

[54] HIGH PERFORMANCE OIL PUMP

[75] Inventors: Gary A. Cross, Jerome; Matthew J. Melling, Clarklake, both of Mich.

[73] Assignee: Melling Tool Company, Jackson, Mich.

[21] Appl. No.: 786,683

[22] Filed: Jan. 21, 1997

[51] Int. Cl.⁶ .............. F04C 2/18; F04C 15/00; F01M 1/10; F16N 13/20
[52] U.S. Cl. .......... 418/47; 418/102; 418/206.7; 418/206.8; 184/6.4; 184/31
[58] Field of Search .......... 418/47, 102, 206.1, 418/206.7, 206.8; 184/6.4, 31

[56] References Cited

U.S. PATENT DOCUMENTS

| | | | |
|---|---|---|---|
| 1,348,772 | 8/1920 | Auger | 418/206.1 |
| 1,689,791 | 10/1928 | McClatchie | 418/206.1 |
| 1,745,800 | 2/1930 | Kramer | 418/206.1 |
| 1,834,754 | 12/1931 | Whaley | 418/206.1 |
| 2,286,816 | 6/1942 | Kishline | 418/47 |
| 2,684,631 | 7/1954 | Anthony et al. | 418/206.1 |
| 2,756,684 | 7/1956 | Renzo | 418/102 |
| 2,842,065 | 7/1958 | Lease | 418/47 |
| 3,145,661 | 8/1964 | Marietta | 418/102 |
| 3,244,110 | 4/1966 | Lee | 418/206.7 |
| 3,482,524 | 12/1969 | Marietta | 418/102 |
| 5,702,234 | 12/1997 | Pieters | 418/206.7 |

FOREIGN PATENT DOCUMENTS

| | | | |
|---|---|---|---|
| 739408 | 9/1943 | Germany | 418/206 |
| 623802 | 5/1949 | United Kingdom | 418/206 |

*Primary Examiner*—John J. Vrablik
*Attorney, Agent, or Firm*—Young & Basile, P.C.

[57] ABSTRACT

An oil pump for high performance internal combustion engines suitable for use with race cars and the like wherein extended wear and tolerance maintenance is achieved by supporting the pump gears on shafts extending through the gears. Balanced dual support of the pump gears is achieved by forming bearing openings in the pump lower housing receiving the lower gear shaft portions and lubrication of the lower housing supported gear shafts is achieved by oil passages communicating with the bearings and the lower housing oil outlet cavity. Screw in plugs and retainers are employed to insure effective assembly even under high vibration, and a bolt-on screened oil inlet achieves superior rigidity and ease of replacement.

2 Claims, 1 Drawing Sheet

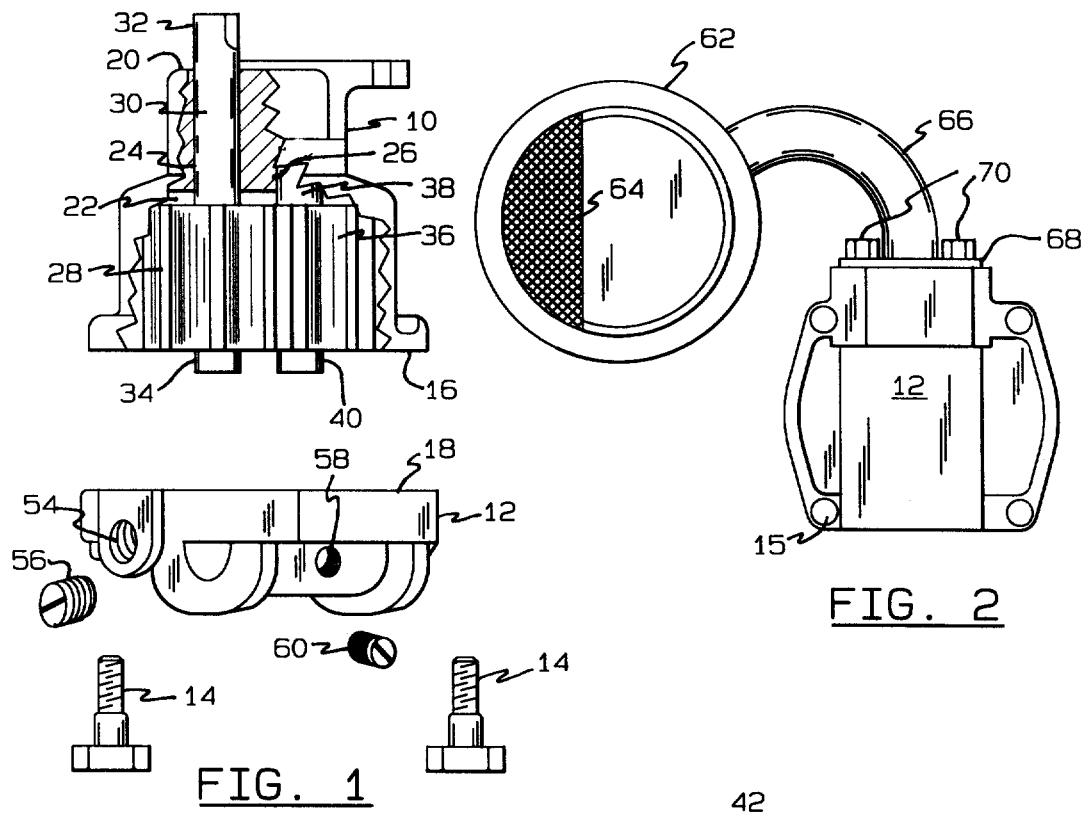
FIG. 2
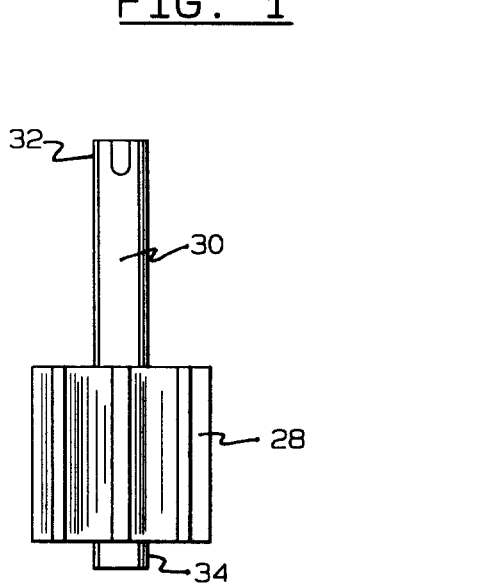
FIG. 1
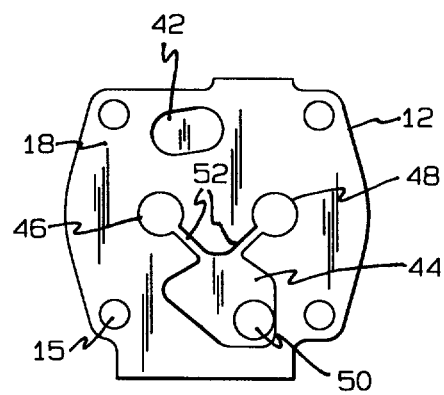
FIG. 3
FIG. 4

HIGH PERFORMANCE OIL PUMP

BACKGROUND OF THE INVENTION

1. Field of the Invention

The invention pertains to geared oil pumps for high performance internal combustion engines utilizing a number of improvements to provide superior operating and maintenance characteristics.

2. Description of the Related Art

Most internal combustion engine oil pumps are of the gear pump type wherein the pump drive gear is connected to the engine camshaft, or other rotating engine shaft, and rotates an idler gear, and the pump consists of upper and lower housings which are bolted together, and an oil inlet mounted on the lower housing is located within the engine pan sump permitting oil to be drawn into the oil pump from the crank case.

In high performance engines such as those used in race cars, the high engine RPM causes rapid wear in the oil pump which is built to close tolerances in order to achieve the high oil flow necessary to lubricate the rapidly rotating engine. Conventional internal combustion engine oil pumps utilize a drive shaft, driven from the engine camshaft, and a spur gear is mounted upon the lower end of the drive shaft. An idler spur gear is rotatably mounted within the pump upper housing and the spatial distance between the gears, and the clearance between the gear teeth, are directly determined by the amount of wear in the bearings occurring between the pump drive shaft and pump upper housing, and the idler gear shaft and the pump upper housing. Even though such bearings are exposed to the lubricating oil within the engine, sufficient wear occurs at race engine RPM's to require oil pump replacement after a few race operations.

Further, conventional engine oil pumps utilize spring retainers for the pressure relief valve located within the lower housing which are inexpensive and of the type which may permit loosening during the extensive vibration to which the oil pump is subjected.

An additional problem with conventional engine oil pumps lies in the attachment of the screened pump inlet to the pump lower housing. Conventionally, the screened inlet tube is welded directly to the pump lower housing, and this weld often fails due to vibration and metal fatigue.

OBJECTS OF THE INVENTION

It is an object of the invention to provide an oil pump for internal combustion engines which is capable of accommodating high speeds and high engine pressures with minimum wear.

A further object of the invention is to produce a geared oil pump for internal combustion engine use wherein lateral pressures imposed upon the gear pumps due to oil pressure and pump vacuum are effectively resisted by greater bearing support of the pump drive and idler gears than normally used.

Another object of the invention is to provide a geared oil pump for internal combustion engine use employing a drive gear and an idler gear wherein the gears are supported on both sides by bearings to resist cantilevered bearing moment on the pump gear shafts.

An additional object of the invention is to provide a geared oil pump for internal combustion engines wherein the pump gears are rotatably supported within bearings on each side of the, gear, the upper portions of the gear shafts being supported in the upper housing while the lower portion of the gear shafts being supported in the pump lower housing, and wherein lubrication of the bearings located in the pump lower housing is achieved through passages defined in the lower housing communicating with the oil outlet cavity defined therein.

A further object of the invention is to provide a geared oil pump for high performance internal combustion engines wherein the inlet tube for the pump utilizes a bolt-on connection to the oil pump, rather than a welded assembly, to provide increased strength of the oil pump inlet mechanism, and permits rapid replacement of the oil pump inlet, if damaged.

SUMMARY OF THE INVENTION.

In the practice of the inventive concepts, the oil pump utilizes conventional upper and lower housings each having a flat opposed joining surface whereby assembly of the housings by bolts permits the chamber located within the upper housing containing the gears to be in communication with oil passages located within the pump lower housing. The flat connecting surface of the lower housing includes a cavity communicating with the pressurized outlet portion of the gears and the cavity communicates with the pump outlet.

In the usual internal combustion engine oil pump construction, the drive gear and idler gear are rotatably supported by bearings, such as a cylindrical recess, defined in the upper housing receiving the associated gear shaft. The gear shafts do not extend through the associated gears, and in effect, both the drive gear and the idler gear are supported in a cantilevered manner. Such support of the oil pump gears places high pressures upon the gear shafts resulting in rapid wear of the pump bearings permitting the clearance between the gear teeth to increase, and lowering the efficiency and pressure producing capabilities of the oil pump.

In the invention, the drive gear shaft extends through the drive gear into a bearing opening defined in the flat surface of the lower housing. In a similar manner, the shaft of the idler gear extends through the idler gear for reception into a cylindrical bearing defined in the lower housing flat surface. In this manner, the pump gears are supported on opposite sides equally distributing the lateral forces imposed on the gears due to oil pressure and the vacuum generated by the oil pump on the "inlet" side of the gears. This improved bearing support of the oil pump gears significantly reduces shaft and bearing wear resulting in a much longer effective life of the oil pump and permits the high oil pressures required with high performance engines to be maintained over a long period of time.

In the practice of the invention, the relief valve spring retainer utilizes a threaded construction for receiving a threaded spring retainer, and the drain plug defined in the oil pump is also of the threaded type.

Conventional internal combustion engine oil pumps use an inlet tube usually containing a screened inlet dish or the like at its outer end, and an inner end which is welded or brazed to the pump lower housing. Due to the high vibration forces to which the engine and oil pump are subjected, such welding or brazing of the tube to the oil pump housing often results in a failed or cracked weld or braze, requiring oil pump replacement. In the invention, the oil inlet tube is bolted to the pump lower housing permitting an ease of replacement not heretofore known, and maintenance requirements of an oil pump in accord with the invention are considerably lower than those required of conventional oil pumps.

BRIEF DESCRIPTION OF THE DRAWINGS.

The aforementioned objects and advantages of the invention will be appreciated from the following description and accompanying drawings wherein:

FIG. 1 is an elevational exploded view of the pump upper and lower halves being separated, portions of the housings being broken away for purpose of illustration, FIG. 2 is a bottom view of the oil pump of the invention, FIG. 3 is a plan view of the lower housing face surface, and FIG. 4 is an elevational view of an oil pump drive shaft and drive gear of an oil pump constructed in accord with the invention.

DESCRIPTION OF THE PREFERRED EMBODIMENT.

An oil pump utilizing the concepts of the invention includes an upper housing 10 and a lower housing 12 which are selectively interconnected by bolts or cap screws 14 extending through holes 15 defined in the lower housing 12.

The upper housing 10 includes a lower flat surface 16 while the lower housing 12 includes an upper flat surface 18, and these flat surfaces will be closely opposed to each other when the housings 10 and 12 are interconnected.

The upper housing 10 includes an upper end 20 and an internal chamber 22 communicating with the cylindrical bore 24 constituting a bearing for the drive gear, as later apparent. The housing 10 also includes a cylindrical bearing bore 26 for the idler gear. The oil pump toothed drive gear 28 includes a drive shaft 30 rotatably received within the bearing bore 24 and the drive shaft upper end 32 extends above the housing upper end 20, FIG. 1, for connection to the oil pump drive mechanism, not shown, usually connected to the associated engine camshaft. The cylindrical drive shaft lower end 34 extends below the drive gear 28, as will be appreciated from FIGS. 1 and 4.

The toothed idler gear 36 is also located within the upper housing chamber 22 and includes a shaft having an upper cylindrical stub 38 rotatably received within the housing bearing bore 26 and a lower shaft stub 40 extends below the idler gear as will be appreciated from FIG. 1.

FIG. 3 is a plan view of the upper surface 18 of the lower housing 12, and from this figure it will be appreciated that the oil passages defined in the housing 12 include an inlet passage 42 which intersects the surface 18 and communicates with a passage, not shown, defined in housing 12 which communicates with chamber 22 whereby oil is transferred to the chamber 22 through the lower housing 12. An oil outlet cavity 44 is also defined within the lower housing surface 18 and communicates with a portion of the lower region of the chamber 22 receiving the pressurized oil therefrom.

Cylindrical bearing shaft bores or openings 46 and 48 are defined in the lower housing surface 18 and rotatably receive the drive gear lower shaft 34 and the idler gear lower shaft 40, respectively. In this manner, the gears 28 and 36 are supported at their lower end as well as the upper end.

An oil outlet passage 50 is defined in the lower housing 12 and communicates with the cavity 44, FIG. 3. Additionally, as will be appreciated from FIG. 3, two lubricating trough passages 52 are defined in the flat surface 18 establishing communication between the outlet cavity 44 and the bearing bores 46 and 48. In this manner, the lower drive gear and idler gear shafts 34 and 40 will be well lubricated during operation.

As will be appreciated from FIG. 1, the lower housing 12 includes a threaded valve bore 54 in which a relief valve spring, not shown, is located. The threaded plug 56 threads into the bore 54 and engages the valve spring to adjust the compression thereof. By the use of a threaded bore and plug, a positive high strength retention of the relief valve spring is achieved.

The lower housing 12 also includes a threaded drain opening 58 selectively sealed by the threaded plug 60. In most oil pumps, an inexpensive non-threaded seal for drain openings is utilized which is not as dependable as the threaded openings and plugs of the invention.

The oil pump is located within the internal combustion engine crankcase and includes an inlet 62 bell or housing which rests within the engine sump for drawing oil therefrom into the oil pump, as is well known. In the practice of the invention, the inlet 62 is provided with a screen 64 which screens out the larger particles preventing the same from entering the oil pump. The inlet 62 is attached to an inlet passage, not shown, defined on the side of the lower housing 12 by a conduit 66 having an eared boss 68 which is attached to the housing 12 by threaded bolts 70. In this manner, the conduit 66 communicates with passages in the housing 12 connected to the inlet passage 42 whereby oil may be drawn into the oil pump chamber 22.

With conventional oil pumps, the drive gear and idler gear are rotatably supported only by shafts located within bearing bores in the upper housing. With the instant invention, the drive gear and idler gear are rotatably supported in both the upper and lower housings and permit a much more effective support of the gears during oil pumping. This improved support of the gears reduces wear and maintains the efficiency of the gear pump at its highest levels for a considerably longer time than achieved with conventional oil pump construction.

Further, the bolt-on conduit 66 and oil inlet 62 are an improvement over the prior art where the conduit to the oil inlet was directly welded or brazed to the lower housing, and susceptible to vibrational damage. With the practice of the invention, the removal of bolts 70 permits a new oil inlet 62 and conduit 66 to be substituted for the damaged oil inlet mechanism.

Another improvement of the invention derives from the use of the threaded plugs 56 and 60, and by establishing communication between the bearing bores 46 and 48 and the pressurized oil outlet cavity 44, adequate lubrication of the shaft's lower ends 34 and 40 is assured.

It will be appreciated that an oil pump constructed in accord with the inventive concepts is capable of high performance and little wear, and it is appreciated that various modifications to the inventive concepts may be apparent to those skilled in the art without departing from the spirit and scope of the invention.

We claim:

1. An internal combustion engine oil pump characterized by its ability to operate at high speeds and pressures comprising, in combination, an upper housing having an upper end and a lower flat surface, a lower housing having an upper flat surface, removable fasteners maintaining said housings in assembled relation with said flat surfaces in opposed relationship, a drive shaft rotatably supported within said upper housing having an upper end extending through said upper housing upper end and a lower end, a toothed drive gear mounted upon said drive shaft intermediate said ends, said drive shaft lower end extending through said gear and extending therebelow, a toothed idler gear meshing with said drive gear, said idler gear having a shaft extending therethrough having an upper end and a lower end, a chamber defined in said upper housing receiving said drive and idler gears, inlet and outlet passages defined in said lower housing in communication with said chamber, a drive shaft bearing defined in said lower housing upper surface receiving said drive shaft lower end, a first idler gear shaft bearing defined in said upper housing receiving said idler gear shaft upper end, a second idler gear shaft bearing defined in said lower housing upper surface receiving said idler gear shaft lower end, said drive shaft bearing and second idler shaft bearing defined in said lower housing comprising cylindrical holes intersecting said lower housing upper surface, said outlet passage including a cavity defined in said lower housing flat surface, and troughs defined in said lower housing flat surface interconnecting said outlet passage cavity and said bearings defined in said lower housing establishing communication therebetween.

2. In an oil pump as in claim 1, said inlet passage intersecting a second flat surface defined on said lower housing, an inlet screened bell adapted to be located within the engine sump, a boss having a flat surface, an unsupported conduit interconnecting said bell and boss, and bolts releasably attaching said boss upon said second flat surface whereby said bell supplies oil to said lower housing inlet passage through said bolt-on boss.

* * * * *